United States Patent [19]

Vagi

[11] 4,058,832
[45] Nov. 15, 1977

[54] DISPLAY FOR TELEVISION IMAGING SYSTEM

[75] Inventor: Robert J. Vagi, Broadview Heights, Ohio

[73] Assignee: Picker Corporation, Cleveland, Ohio

[21] Appl. No.: 664,367

[22] Filed: Mar. 5, 1976

[51] Int. Cl.² .............................................. H04N 7/18
[52] U.S. Cl. .................................... 358/110; 358/111;
358/130; 358/242; 358/244
[58] Field of Search ................ 178/DIG. 5, DIG. 24,
178/DIG. 2, DIG. 34, 5.8 R, 7.8, 7.82, 6;
313/467, 469; 358/111, 110, 242, 244, 243

[56] References Cited

U.S. PATENT DOCUMENTS 3,894,181  7/1975  Mistretta ............................. 358/111

OTHER PUBLICATIONS

Sid K. Freeman, "Radiology", 6—20—73, Hughes Aircraft Co.
V. K. Zworykim, "Television", 2nd Ed., 1954, p. 978.

Primary Examiner—Robert L. Griffin
Assistant Examiner—Edward L. Coles
Attorney, Agent, or Firm—Watts, Hoffmann, Fisher & Heinke Co.

[57] ABSTRACT

A radiation imaging system and method is disclosed for producing an enhanced television image of diagnostic quality from a light image produced by a common image tube and corresponding to a pattern of penetrative radiation from a subject. A source directs radiation such as X-rays through the subject and the image tube converts the emergent radiation pattern to a corresponding visible light image at an output phosphor. A television apparatus including an image isocon pickup tube views the output light image at a tube input face by way of a lens assembly and converts the light image to electrical, including video signals. A television monitor reconverts the electrical signals to a visible television image of enhanced quality representing the pattern of radiation from the subject. The television monitor includes an improved cathode ray tube with a planar output face, a small focal spot, and improved phosphor.

2 Claims, 5 Drawing Figures

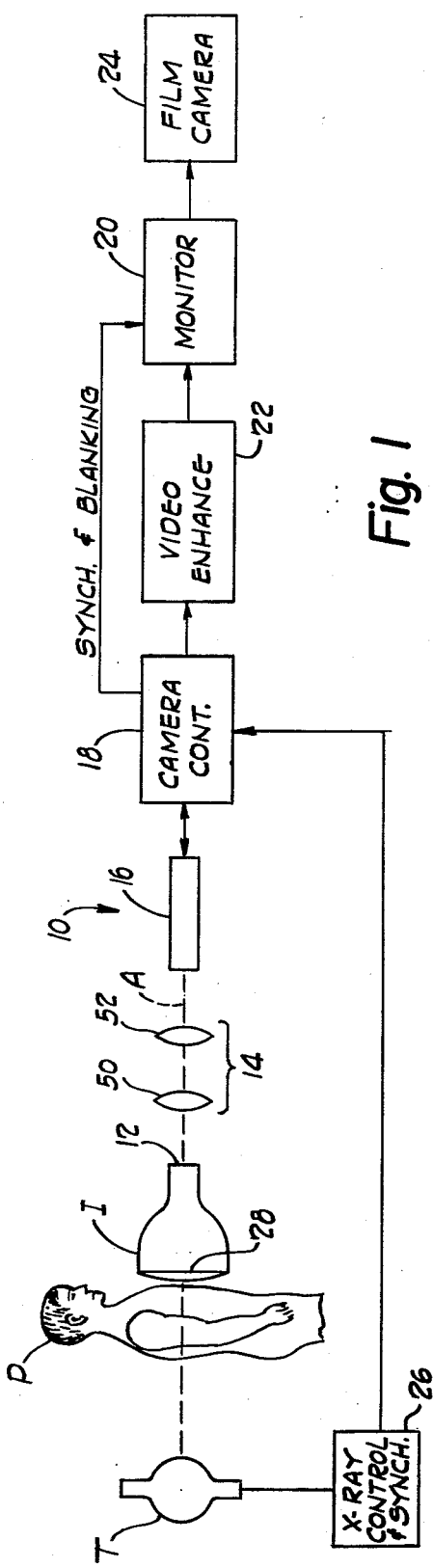
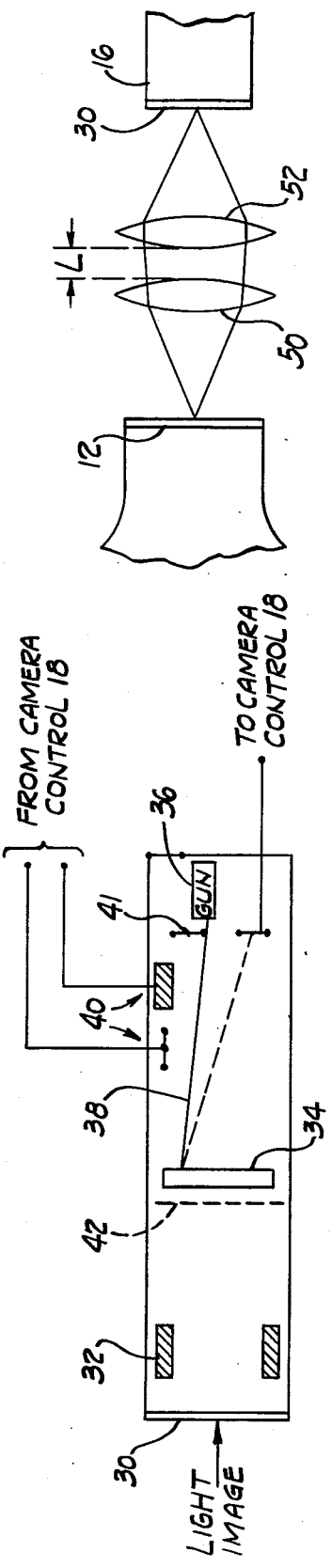

DISPLAY FOR TELEVISION IMAGING SYSTEM

CROSS-REFERENCE TO RELATED APPLICATIONS

U.S. patent application, Ser. No. 664,368, filed concurrently with this application by Robert W. Brougham, et al., entitled "IMPROVED TELEVISION IMAGING SYSTEM AND METHOD."

BACKGROUND OF THE INVENTION

1. Field of the Invention

This invention relates to an image display apparatus for an X-ray television imaging system producing television images of diagnostic quality from radiation patterns from a subject, coverted to light images by an image tube.

2. Description of the Prior Art

In many medical X-ray diagnostic procedures, radiopaque material is injected into, or injested by, a patient and X-rays are then directed through the patient. The radiation which is transmitted through the patient produces a fluorographic and/or a radiographic shadow image of the opaque material. This image provides diagnostic information about the tissues which surround and shape the opaque material.

A basic type of X-ray inspection is so-called "bright fluoroscopy." With bright fluoroscopy an image intensifier tube produces an intensified fluoroscopic image which is viewed selectively or concurrently by film and television cameras. Television imaging techniques produce a substantially continuous image of the region of interest of the body. The film cameras produce both single frame ("spot") photographs, and motion picture or "cine" exposures.

Television imaging is particularly useful in applications in which the areas of differing radiopacity in the subject exhibit motion or are otherwise time varying. Television, for example, can allow the physician to watch the progress of a radiopaque material ingested by the subject through the alimentary canal, or can be used to observe progress of such material injected into blood vessels.

With a typical bright fluoroscopy system, an X-ray image tube is axially aligned with an X-ray beam. An X-ray stimulated light image is produced on an input phosphor of the image tube. This light image causes an adjacent electron emitting layer to emit electrons that are accelerated against an output phosphor to produce a relatively small and intensified output image.

A so-called "optical cube" is coupled to the image tube. The optical cube typically has an axially aligned television camera and spot and cine film cameras positioned with their optical axes normal to an extension of the image tube axis. Transmissive mirrors known as "beam splitters," are used to selectively distribute the light among the two film cameras and the television camera. The output of the television camera is transmitted to one or more monitors for dynamic viewing of a study being conducted.

Many variations of the described system have been proposed or produced. For example, film cameras have been used to produce either single frame or moving picture images of the output of a television monitor. While the output of the television monitor has been photographed, the resolution of photographic images of television monitors has been poor as compared to that of images produced by cameras that are optically coupled to the output phosphor of the image tube.

Systems have been produced in which the X-ray source was pulsed in synchronism with the field scan rate of a television camera at about 1–6 pulses per second. This reduced the X-ray dosage received by the patient in the course of an examination, but still maintained an apparently continuous image on the television monitor so long as cine and spot films were not being taken.

The system described here, while furnishing adequate television fluoroscopic images for general observations and some diagnostic purposes, has not provided television images of sufficiently high resolution for use as actual diagnostic tools in many other procedures. This loss in resolution is due to losses in optics and in production of the television image.

The ability of an optical element (including, e.g., an image tube, a lens, a television camera, or a cathode ray tube display) to resolve images is often described in terms of its "modulation transfer function" (MTF). Normally, the ability of an optical system to resolve a portion of an image decreases as the fineness of detail of the image portion (the number of lines per unit distance) increases. This degraded resolution is manifested as a reduction in the contrast between the light areas and the dark areas of the image portion. The number of lines per unit distance is frequently expressed as "line pairs per millimeter," and is known generically as the "spatial frequency" of the image portion of interest.

The modulation transfer function (MTF) is defined as the function of the percent of contrast in the image with respect to the spatial frequency of the features of the image portion. The percent of contrast is defined as a function of the maximum light energy per unit area (brightness) in the light areas of the picture portion under consideration ($B_{max}$) and the energy per unit area of the darker areas ($B_{min}$). Specifically, the contrast ratio is defined as:

$$\frac{B_{max} - B_{min}}{B_{max} + B_{min}}$$

Tests on several prior art X-ray television imaging systems have shown these systems as having a total "modulation transfer function" defined approximately by the ranges of points designated as follows:

| Line pairs/m.m. | % Contrast |
|---|---|
| 0.25 | 50–65 |
| 0.50 | 15–45 |
| 1.00 | 0–5 |

Because of the limited resolution of television imaging, examiners have employed the television images mostly for general observation to determine regions of interest.

Once the region of interest is determined, radiographs or films of the image tube output are used for the final diagnosis.

The limited resolution of prior systems resulted in part from brightness losses in the optical coupling between the output phosphor of the image tube and the television pickup tube. Attempts were made to improve prior systems with circuitry for enhancing the contrast of the television image, but such attempts failed to improve resolution, because of the deterioration of the signal to noise ratio in the television image. Other attempts to improve resolution included the use of very large aperture lenses for the lens assembly, but such lenses are quite expensive and suffer from significant aberrations which distort the transmitted image. The necessity for providing the mirror structure associated with the lens assembly (for enabling the use of the second film camera) resulted in substantial vignetting of the image. The television pickup tube employed in the previous system also suffered a deterioration in resolution when operated in the pulsed mode, such as required in X-ray imaging systems. The television monitors used were not readily engageable for operation with downstream optical components of the system, such as film cameras, and these CRT displays suffered deteriorated modulation transfer functions when image brightness was increased substantially.

The magnification of the output phosphor image (which was about 20 millimeters in diameter) was required of the lens assembly to take full advantage of the input face area of the television pickup tube, which is about 35 millimeters in diameter. The required magnification of the image tube output image aggravated the loss of brightness in the lens assembly in the course of transmission from the output phosphor to the pickup tube, since an image becomes dimmer when magnified.

The prior system failed to provide television images of sufficient resolution also because of noise in the electrical television composite signals. Both the noise and the poor resolution result from severe restrictions on the intensity of X-rays which may safely be directed through the subject. With such low X-ray intensities, the visible image at the image tube output must necessarily be relatively dim, and of low contrast, and the prior system did not have sufficient sensitivity to resolve these low contrast images. Improvement of the system has been attempted by various means of generalized contrast enhancement of the television image by amplification, but these attempts have not been very successful. When the signals from the television camera are generally amplified to increase contrast, noise present in the television signals is also amplified, and appears objectionably in the television image produced.

Several other means have been attempted to enhance the sensitivity and hence the resolution of the prior system. One of these has included the use of very large aperture lenses for the lens assembly between the output phosphor and the television camera input, to gather as much light as possible from the image tube output and transmit it to the television camera. Such lenses have had apertures of as much as $f/0.75$. The lens assemblies have included a collimating lens positioned to receive the image from the output phosphor, and a focusing lens to focus the image on the television pickup tube input. The need for magnification of the output phosphor image dictates that the collimating and focusing lenses be unmatched.

Large aperture lenses are expensive, and the expense is further aggravated by the necessity for grinding two different lenses for each system. Moreover, the use of two lenses having different focal lengths (i.e., nonsymmetrical) causes the lens aberrations which normally occur in each of the lenses to be additive and to distort the transmitted image.

In the prior system, the two lenses of the lensing system have been separated by several millimeters, to accomodate the mirror beam splitter therebetween, for directing a portion of the light from the output phosphor passing through the collimating lens, to the second film camera disposed transverse from the optical axis of the system. This spacing between the two lens elements contributes to vignetting (loss of brightness in the peripheral areas of the image with respect to central brightness) of the image passed to the television pickup tube.

Other structure has also been designed to provide for direct photography of the image at the output phosphor of the image tube. According to this other structure, the second film camera is aligned with the optical axis of the image tube, and the television pickup tube is disposed transverse to that axis. A diverter is provided in the optical axis, positioned between a set of lenses for transmitting and focusing the output phosphor image. The diverter deflects light energy from the output phosphor to the television camera in synchronism with the field scan rate of the television pickup tube. During the remainder of time, the diverter allows the unimpeded passage of the output phosphor energy to the film camera. Such a system is described in the copending application Ser. No. 537,776, filed Dec. 31, 1974 by Fred H. Meyer and assigned to the assignee of this application.

Both these systems for deploying the second film camera require the camera to be mounted in a fixed spatial relation to the image tube, lens assembly, television pickup tube and, with respect to the system of application number 537,776, the diverter.

The sensitivity and resolution of the prior systems has been improved somewhat by the use of highly sensitive image isocon television pickup tubes. The image isocon includes an input face (photocathode) for emitting electrons in accordance with the brightness distribution of the viewed visual image, and a glass target against which the electrons from the photocathode are directed. A conductive mesh is interposed between the photocathode and the target, being displaced approximately 25 microns from the target. The charge distribution on the target varies corresponding to the viewed image, i.e., to the pattern of electrons directed onto the target by the photocathode. An electron gun produces a reading beam current of electrons which is scanned across the target line by line. Part of the beam current is reflected back away from the target, and the reflected beam current varies with respect to the potential distribution on the target resultant from the charge pattern. By sensing the instantaneous charge flow rate of electrons reflected from the target, an electrical signal is derived representing in analog fashion the instantaneous relative brightness of each portion of the viewed image being scanned.

The inherent resolution of the image isocon television pickup tube is enhanced by a phenomenon known as "redistribution." When electrons from the photocathode strike the target, they cause the emission from the target of between three and four times as many secondary electrons. Normally these secondary electrons migrate to the mesh, which is normally maintained at a potential about 3 volts more positive than the target. This results in an accumulation of net positive charge in the region of the target during a continuous influx of electrons from the photocathode to the target. When the net charge in the target region becomes generally positive, the secondary electrons, rather than moving toward the mesh, accumulate and "redistribute" themselves at nearby locations on the target. This redistribution is such that the charge distribution areas on the target representing dark areas become darker, and those areas representing lighter areas become lighter. This generally enhances the outlines of the light and dark portions of the image, as represented by the target potential pattern and by the video signal which is produced by the reading beam. This feature is particularly advantageous in X-ray systems, because of inherent low detail and low contrast of the visible image at the image tube output phosphor.

The image isocon, however, loses a significant portion of its advantages when used in a pulsed X-ray system, wherein the pickup tube scan rate is equal to the pulse rate, i.e., about 1–6 cycles per second. The image isocon exhibits degraded redistribution in the pulsed mode of operation. It is not fully understood why the image isocon exhibits pronounced redistribution only in substantially continuous operation, but this in nonetheless a fact, and inhibits its utility in pulsed X-ray applications.

Resolution was also reduced by the lack of resolving power and limitations on image quality of the CRT television display apparatus. The CRT displays used in the past have had generally rounded convex faces, making them difficult to optically couple with lenses of cameras and other optical processing apparatus, and contributing to optical distortion of recorded television images. Moreover, those phosphors commonly used in the CRT (e.g., "P4" phosphor, emitting white light), have not been ideal for use in exposing most films, including the newer type dry process films, which are most sensitive to blue light. The use of phosphors fluorescing in other than blue light has required the use of higher beam currents to obtain needed brightness. As is known, resolution of a CRT decreases as beam current increases.

At normal beam currents, the focal spot size of the electron beam of those prior CRT's ranged between 0.010 and 0.020 inches, which is too large for resolution required for producing relatively high resolution images.

The prior system had very substantial mass and bulk, due to the need for mounting the second film camera on the unit in an integral fashion with the other system elements to maintain its disposition for making the direct high resolution photos of the output phosphor image. This requirement increased the complexity, size and cost of equipment for supporting and maneuvering the system about the patient's body.

The prior system lacked flexibility of use, in that remote viewing of real-time high resolution images was not possible. Rather, the film had to be removed from the second film camera and processed before viewing, a time-consuming and annoying process which often extended the time the patient had to remain in the examination room.

The size of the prior system and of the mechanism for moving it sometimes caused patients undue anxiety.

In the past, the size and mass of the imaging system, and the need for moving it efficiently about the patient, generated much effort in providing mechanisms for support and easy motion. Such support apparatus included tall tower structures and complex counterweighting systems. As systems grew heavier, the problems of support and motion became more acute, and the mechanisms substantially increased the amount of space required in the examination room. Great care had to be used to mount the apparatus for safe support of the heavy imaging systems.

It is a general purpose of this invention to provide a high resolution, low noise compact television imaging system for producing high quality television images from visible light images from an ordinary X-ray image intensifier tube.

SUMMARY OF THE INVENTION

A system and method incorporating this invention overcomes the disadvantage of the prior system by providing an improved X-ray television imaging system for producing diagnostic quality television images. The system includes a source for directing pulsed penetrative radiation such as X-rays through a subject, and an image tube for receiving the patterns of radiation emerging from the subject, and converting these radiation patterns to corresponding visible light images at an output phosphor. A lens assembly focuses the light image on the input face of a television camera pickup tube, and camera control circuitry cooperates with the pickup tube to produce a composite electrical television signals representing the visible light image from the image tube. Video enhancement circuitry processes the video portion of the composite television signal to emphasize fine image detail represented by the video signals. The enhanced television signals are reconverted to a second light image of diagnostic quality by a television monitor, this image being both viewable directly, and susceptible of recording by a film camera.

The improvements of the system embodying this invention derive from several specific features. Loss of energy from the light image in its transmission to the pickup tube is reduced by matching the size of the output phosphor of the image tube to that of the input face of the pickup tube. This enables use of a simpler and more effective lensing assembly between the image tube and the pickup tube. The system utilizes a television pickup tube having improved sensitivity and resolution in the pulsed mode. The video signals generated by the television pickup tube and camera control circuitry are processed to enhance disproportionately those video signals representing fine detail, to improve resolution in the visual image which is produced by the television monitor. A television monitor is used having improved resolution and compatibility with other elements of the system. The improved resolution of the television imaging system makes possible the simplification of the system for producing diagnostic quality images.

The improved monitoring apparatus of this invention includes a cathode ray tube having a planar face, rather than the conventional convex face, for improved optical coupling with lenses, cameras, and other downstream processing apparatus. The monitoring apparatus has an improved output phosphor, producing a blue light, to which most films are more sensitive than to other colors, enabling more rapid film exposures. The cathode ray tube also has a smaller beam focal spot than previously used in these applications, i.e., about 0.0017 to 0.0024 inches in diameter, for normal beam currents of about 4 to 25 microamperes.

The increased resolution of this system for the first time makes possible the production of diagnostic quality television images of X-ray patterns, making television imaging more useful than ever before. This increased performance eliminates the previous reliance on a second film camera for making diagnostic quality images.

The elimination of the second film camera decreases the size and mass of the imaging system, and the applicability of television imaging for producing diagnostic images improves the flexibility of the system.

The smaller, lighter imaging system reduces the complexity and cost of the support and motive structures required for its use. The smaller system is less unnerving to patients. Images produced by the system can be viewed instantaneously as generated, and the viewing can take place at a location remote from the patient. Several imaging systems can be multipled together with a single viewing station to enable one physician to view images of several patients in rapid succession without moving about.

The referenced application filed concurrently with this case relate to various aspects of this imaging system and its operation. The demarcation between these cases exist because of differences in the inventorship of the various features claimed therein.

Certain concepts basic to the system described above were conceived by two inventors, and form the subject matter of the above-referenced Brougham, et al., application. A single inventor conceived the use of a particular type of image display device for use in the system, and that development forms the basis of this application.

DESCRIPTION OF THE DRAWINGS

FIG. 1 is a diagrammatic and block diagram illustrating a system incorporating the features of this invention;

FIGS. 2-4 are detailed diagrammatic views showing the internal structure of portions of the system illustrated in FIG. 1;

DESCRIPTION OF THE PREFERRED EMBODIMENT

Figure 4:
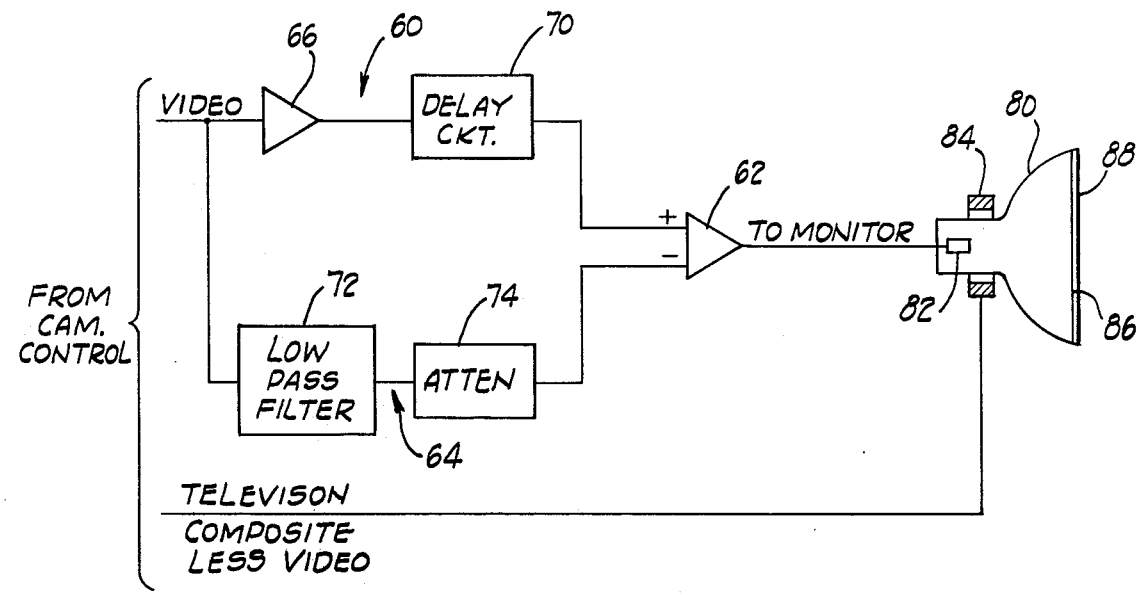

FIG. 1 shows an X-ray television imaging system incorporating the improvements of the present invention. The imaging system converts patterns of penetrative radiation, such as X-rays, emanating from a subject to a corresponding improved television image. An X-ray tubehead T directs X-radiation through a subject patient P. An image tube I receives the patterns of X-radiation emanating from the patient P and produces a visible light image corresponding thereto at an output phosphor 12. The visible light image is transmitted by a lensing assembly 14 along an optical path A to the input face of a television camera pickup tube 16. Camera control circuitry 18, in cooperation with the pickup tube 16, controls the pickup tube and generates signals in conjunction therewith comprising a television composite electrical signal representing the visible light image appearing at the output phosphor 12 and viewed by the pickup tube 16. The camera control circuitry 18 transmits scanning, synchronization and blanking signals to a display monitor 20, and transmits the video portion of the electrical television composite signals to a video enhancement circuit 22. The video enhancement circuit 22 increases the relative amplitude variation of these video signals having a frequency above a predetermined value, i.e., those video signals representing fine detail in the image appearing at the output phospor 12. The video enhancer circuit 22 transmits the enhanced video signals to the monitor 20. The monitor 20, in response to the television composite signal, produces a visual display constituting an enhanced quality image corresponding to the light image appearing at the output phosphor 12. A film camera 24 is positioned to view the monitor display and to record the images appearing thereon on light sensitive film.

The penetrative X-radiation is generated by the X-ray tubehead T in pulses occurring from about one to six per second in response to signals from an X-ray control synch circuit 26. The field scanning cycles of the pickup tube are synchronized by the circuit 26 to occur a short time after each X-ray pulse from the tube T. This relative infrequency of scanning (compared with the normal television rate of 30 cycles per second) is known as "pulsed mode" operation. The pulsed X-radiation passes through the body of the patient P and emerges therefrom in patterns which represent information as to the condition of his body. The X-ray tubehead T and the control circuitry 26 are both of known type, and can be provided by one of ordinary skill.

The image tube I receives the patterns of penetrative radiation from the patient P and converts these patterns to corresponding light images for subsequent processing. The image tube I is of known type, and includes a photocathode portion 28 with approximately a 9-inch diameter, which emits electrons in response to the impingement of the penetrative radiation pattern thereon. Electrical apparatus (not shown) accelerates and focuses the electrons from the photocathode onto the output phosphor 12. The output phosphor 12, in response to the impingement of these electrons, emits visible light energy in a pattern corresponding to the pattern of received penetrative radiation. The output phosphor is preferably made of a single crystalline cesium iodide material.

The image tube is improved for this application over those of the prior art by its provision with an output phosphor considerably larger than those used previously, in order to match its size and shape with that of the input face of the pickup tube 16, as is described more fully below. Preferably, the output phosphor 12 is of circular configuration, having a diameter of approximately 35 millimeters.

The pickup tube 16 receives light energy from the visible light image appearing at the output phosphor 12 and converts the light energy to an electrical video signal bearing brightness information corresponding to the brightness distribution of the visible light image. Preferably, the television pickup tube 16 comprises an image isocon tube. The image isocon tube has an inherent sensitivity and resolution capability superior to many previous tubes, due in part to a phenomenon known as "redistribution" which is described in detail below. The redistribution phenomenon, however, is attenuated considerably during the tube operation in the pulsed mode (as practiced in this case) as opposed to continuous operation, and hence its resolution suffers in the pulsed mode. The image isocon, therefore, has been improved to compensate for this attentuation of the desirable redistribution characteristic.

The major components of the image isocon are illustrated diagrammatically in FIG. 2. Light energy from the output phosphor 12 impinges upon a photocathode input face 30, which responds thereto by emitting electrons in a pattern corresponding to the spatial brightness distribution of the received light energy. These electrons are accelerated by a yoke 32 toward a glass target 34.

Some of the electrons strike the glass target and the target thereby acquires a charge pattern thereon which has a special distribution corresponding to the brightness distribution of the viewed light image. An electron gun 36 directs an electron reading beam 38 toward the target 34, the beam being scanned across the target in a line-by-line fashion by a set of deflection and focusing plates and yokes, generally designated in FIG. 2 as 40 and controlled by the camera control circuitry 18. Preferably, the scanning cycle constitutes a 945 line scan, taking place in about 33 milliseconds.

As the reading beam 38 scans the target 34, secondary electrons are emitted from the target back toward the general direction of the electron gun 36. The current represented by the flow of these reflected electrons depends on the potential, and hence the charge at the target portion being scanned. By sensing the current of the reflected electrons as the reading beam is scanned (e.g., by way of a known sensor 41), connected to a sensing circuit (not shown) a signal can be derived which corresponds to the instantaneous brightness represented by the charge distribution of the portion of the target being scanned at any given moment. This signal, bearing brightness information, is known as the video portion of the television signal, and, as described below, is used in producing a visible image having a brightness distribution corresponding to that of the visible image sensed by the pickup tube 16.

Electrons striking the target 34 from the photocathode 30 cause the target to emit secondary electrons. Some of these secondary electrons return to the target and in doing so "redistribute" their charge in such a manner that the contrast of the image represented by the potential distribution on the target is enhanced in contrast and outline. This phenomenon is most in evidence when the pickup tube is operated in a continuously scanning mode, but is less effective when the tube is operated in a pulsed mode, i.e., scanning taking place only over certain intervals which are relatively short compared with the time between the scanning operations. The structure of the image isocon has been modified in accordance with this invention to compensate for this decrease in the redistribution phenomenon.

When electrons from the photocathode 30 strikes the target 34, about 3-4 as many of the secondary electrons are emitted by the photocathode. The secondary electrons have a low energy level (about 1-3 electron volts). Since each incident electron causes the release of several secondary electrons, the target takes on a positive potential in the regions where it is struck most heavily by electrons from the photocathode. These positively charged areas of the target represent light areas of the picture, the more negatively charged areas representing the darker regions.

The glass target 34 is part of a target assembly which also includes a fine conductive mesh 42. The mesh 42 is positioned on the side of the target facing the photocathode, and is quite close to the target. The mesh is maintained at a voltage of approximately 3 volts positive relative to the target. The mesh collects and holds secondary electrons which are emitted from the target in response to the incidence of electrons from the photocathode. If the mesh 42 did not trap at least some of the secondary electrons, they would simply fall back onto the target, the areas of positive charge would not be created, and no charge potential representing the image would be produced on the target.

When the image isocon views an image, a large number of electrons from the photocathode strike the target, and the target thereby acquires a substantial overall positive charge, raising its potential to the point at which it approaches the potential on the mesh. As this occurs, the mesh attracts a smaller fraction of the secondary electrons. The remaining electrons which are not so attracted are relatively free to fall back upon the target. It is known that, when these secondary electrons return to the target, they tend to align themselves in areas of the target corresponding to the darker portions of the image. They thus alter or "redistribute" the potential distribution of the target such that the potential areas representing the darker portions of the image appear even darker to the reading beam.

While the reasons for this "redistribution" phenomenon are not fully understood, it is clear that the phenomenon takes place in the image isocon, and that it enhances the resolution capabilities of this pickup tube by causing the outlines of the image to become more distinct and the contrast to become greater.

This redistribution effect is substantially attenuated when the image isocon is operated in the pulsed mode, i.e., when it scans from approximately one to six cycles per second. The reason for this degradation of the redistribution effect is not fully understood, but the resolution advantage of the image isocon deteriorate substantially when the tube is operated in a pulsed mode.

The image isocon of this invention has an improvement feature which compensates for the deterioration in resolution in pulsed mode due to the degradation of the redistribution effect. Specifically, this compensation is an improvement in the modulation transfer function of the target assembly (the target 34 and mesh 42) which is achieved by placing the mesh very close to the target. Preferably, the mesh of the image isocon of this invention is located not more than approximately 12 microns from the target, the target and the photocathode being separated by approximately one and one-half inches.

Although the image isocon tube, modified in accordance with this invention, had good performance in this application, another suitable embodiment of the pickup tube is known as the plumbicon tube. A suitable plumbicon is a Model 1023C, manufactured by Amperex Corporation, Slatersville, R.I.

The effective input face of the photocathode 30 has a circular form approximately 35 millimeters in diameter. The configuration of this input face is substantially identical to that of the output phosphor 12 of the image tube I.

The matching of the output phosphor 12 with the photocathode 30 makes possible the use of a lensing assembly 14 which is simpler, less costly, and has better performance characteristics than the previously used lensing systems. This lensing system is shown in detail in FIG. 3, as interposed along the optical axis between the output phosphor 12 and the photocathode 30 of the pickup tube 16. The lensing assembly 14 includes a pair of substantially identical lenses 50, 52. The lens 50 acts as a collimating lens, and the lens 52 acts as an imaging lens to focus the collimated rays from the output phosphor 12 onto the photocathode 30. The lenses 50, 52 are separated by a distance L of approximately ½ inches, and preferably have apertures of about $f2$ and focal lengths of about 100 millimeters.

Several advantages derive from the use of the lensing assembly as shown in FIG. 3. The use of identical lenses enables each lens to cancel out some of the aberrations of the other, resulting in a reduction of distortion of the transmitted image. This lens symmetry is made possible by the absence of a requirement for magnification of the image from the output phosphor 12, due to the output phosphor 12 being size matched to the photocathode effective input area 30.

The close spacing of the two lenses is made possible by the high resolution and favorable modulation transfer function of this system, whereby the television picture on the monitor 20 has sufficient resolution and sharpness of detail to qualify for diagnostic use. This anality of the television image eliminates the need for making direct photographs of the output phosphor 12 by a mirror and second film camera between the lenses 50, 52 (forcing their separation). The close spacing of the lenses reduces vignetting, i.e., loss of brightness in the peripheral areas of the transmitted image, and improves the transmission characteristics of the lens assembly 14.

The camera control circuitry 18 produces known signals for controlling the scanning and focus of the electron reading beam of the pickup tube 16, and for blanking the electron reading beam at appropriate times to accomplish line-by-line scanning of the target by the reading beam. The camera control circuitry receives the video signals (representing the amplitude modulation of the reflected electron beam) and thereby transmits information representing the brightness distribution of the image viewed by the pickup tube. The camera control circuitry 18 additionally produces synchronization pulses which, with the video and blanking signals constitute the composite electrical television signals representing the image viewed by the pickup tube. The camera control circuitry 18 transmits the synchronization and blanking signals to the television monitor 20 to control the operation of the monitor 20 to produce a suitable raster which, when modulated with the video signals, produces a television image of the light image at the output phosphor 12.

The video signals are transmitted from the camera control circuitry to a video enhancement circuit 22 before being passed to the monitor. The video enhancement circuit 22 increases the relative amplitude variations of the video signals representing the fine detail in the image represented by the electrical television signals (i.e., the video signals having relatively high frequencies) with respect to the amplitude variations of the lower frequency video signals.

The video enhancement circuitry 22 (see FIG. 4) produces a video output signal in which the high frequency video signals from the pickup tube 16 have an increased amplitude with respect to the lower frequencies. This enhancement of the higher frequency components produces a video output which enhances the fine detail of the image thereby represented. The fine details emphasized include representations of small variations in X-ray permeability of tissue types which are used to identify the types of tissue appearing in an image of an X-ray pattern. Other fine details emphasized include interfaces between types of tissue appearing. Such an enhanced image appears sharper and subjectively more pleasing than unenhanced images. The enhancement is accomplished without altering the overall black-white contrast balance of the image, and without introducing or amplifying noise in the image.

Figure 5:
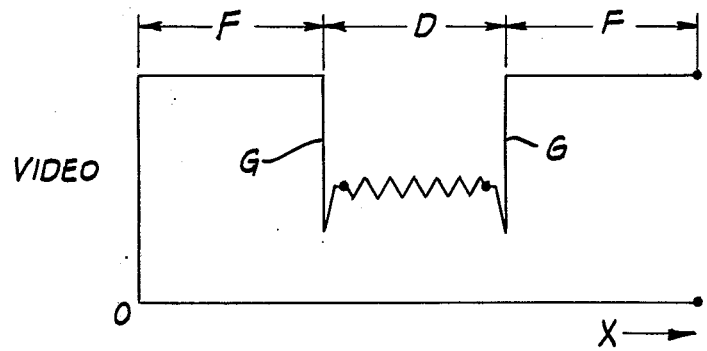
FIG. 5 is a graphical representation of a feature of some of the signals processed by the system of FIG. 1.

FIG. 5 is a graphical representation of the analog value of the video signal from the picture tube 16 and the camera control circuit 18, plotted against horizontal displacement of the reading electron beam as the television camera tube 16 scans across a single line of the target image. This graphical representation depicts the video signal level as the scanning beam transverses one line of an image wherein there is represented a portion of the patient's body having only partial and spatially irregular permeability to X-rays. This region of the line scan shown in FIG. 5 is indicated as having a width D. The adjacent regions, indicated as F, represent areas of the image in which there is substantially no attenuation of the X-rays passing through the patient's body. A concrete example of the graphical representation of FIG. 5 would result in a case where the region D encompasses a bone of the body, while the regions designated F correspond to fleshy parts of the body surrounding the bone.

It is known that various types of human tissue (bone, stomach, gall bladder, etc.) have irregular and finely detailed patterns of permeability to X-rays. These irregularities in permeability are observable as variations in the intensity of the X-rays passing through the tissue, and are known as "trebeculations." These irregularities occur with differing predominant spatial frequency of the detail being characteristic of the type of tissue through which the X-rays pass. These dominant spatial frequencies of the trebeculations are useful in identifying the types of tissue appearing in various portions of an X-ray image.

It is desirable to emphasize the appearance of these fine detail characteristics in the viewed image, because it renders easier the identification of the types of tissue through which the X-rays pass, and also because such emphasis yields a subjectively more pleasing and apparently "contrasty" image. It is also desirable to emphasize the interfaces between various types of tissue.

As shown in FIG. 5, the characteristic spatial frequency of the detail characteristics for the type of tissue in the region D is represented by the illustrated small, high frequency variations in the amplitude of the video signal as the reading beam scans across one line of the image. The interfaces between the fleshy tissue of the areas F and the bone tissue of the area D are shown by the sharply sloping lines G.

FIG. 5 shows that, in the areas F, which are generally and uniformly permeable to X-rays, there is virtually no variation in the amplitude of the video signal. On the contrary, in the area D denoting bone tissue, and in the region of the lines G, indicating the interface between bone and other tissues, the amplitude of the video signal changes with a high frequency. It is these high frequency variations, indicating the detail spatial frequency characteristics of more or less solid tissue, and interfaces between various tissues, which are sought to be amplified in the system of this invention.

It is not, however, desirable to amplify all the video signals, since this would alter the level of the video signal in the areas F, which would in turn change the black-white overall balance of the picture. If all the video signals were uniformly amplified, considerable noise and spurious signals would appear in the image output, since all the signals would be raised in amplitude and the noise amplitude would become apparent.

As shown in FIG. 4, the video enhancement circuitry 22 includes a first branch 60 for transmitting the entire frequency spectrum of video signals to one input (+) of a differential amplifier 62. The other input (−) of the amplifier 62 is supplied by a low pass branch 64, which inputs only the relatively low frequency video signals to the amplifier 62. The first branch 60 amplifies the full spectrum of video signals, while the low pass branch 64 delivers the lower frequencies to the amplifier 62, to be subtracted from the full spectrum. Therefore, the output of the amplifier 62 is a signal representing the amplified full video spectrum, less the lower video frequencies, producing an output in which the higher video frequency components are enhanced relative to the lower frequency components.

The first branch includes an amplifier 66 and a delay circuit 70, whose function is described below. The low pass branch 64 includes a low pass filter 62 for filtering out the higher video frequencies, and an attenuator 74 for adjusting the amplitude of the lower frequency video signals output from the low pass branch 64, which are subtracted from the full video spectrum by the amplifier 62.

The low pass filter 72 is a known type of filter having a pass band extending from approximately zero frequency to 1 megahertz (MHz). The characteristics of the low pass filter 72 are such that it retards the phase of the video signals passing through it. Consequently, the phase of the video signals passing from the low pass branch 64 to the amplifier 62 is retarded with respect to the video signals appearing at the output of the amplifier 66 in the first branch 60. If the signals from the first branch were impressed upon the amplifier 62 in their unshifted form, the output of the amplifier 62 would be spuriously affected because the amplifier 62 produces an accurate difference signal only when the phases of the signals at its two inputs are equal.

The delay circuit 70 delays the full spectrum of video signals from the amplifier 66 slightly, to place them in phase with the signals from the low pass branch 64, and enable the amplifier 62 to produce an accurate difference signal. The delay circuit 70 suitably comprises a known cable type of delay device, or another type of more compact delay circuitry known in the art. The characteristics of the delay circuit 70 are matched with those of the low pass filter 72, so that the time delay imposed by the delay circuit 70 is substantially equivalent to the average phase delay caused by the low pass filter 72.

The enhanced video signals, and the synchronization and blanking signals making up the remainder of the television composite, are introduced to the television monitor 20. In response to these signals, the monitor 20 produces an enhanced television picture corresponding to the image viewed by the television pickup tube 16. The television monitor 20 is suitably embodied by a cathode ray tube having an envelope 80, an electron gun 82 and deflection plates and focusing coils represented at 84 for deflecting the electron beam from the gun 82 onto a phosphor screen 86 inside an output face 88.

Preferably, the output face 88 is substantially planar rather than the generally convex tube face configuration used in conventional cathode ray tubes. The advantage of this construction is that the image on the flat face 88 is readily couplable optically in a uniform fashion with lensing and other optical processing equipment which may be used to process the television image produced by the monitor 20. The output face of the cathode ray tube is circular and is approximately five inches in diameter.

The phosphor layer 86 consists of a material (designated P11) which fluoresces in a predominately blue color when excited by the electron beam. This phenomenon is beneficial because most films, including the newer types of dry process films, which have unusually fine grain structure and are particularly easy to process, are most sensitive to blue light. The blue color of the image appearing at the face 88 causes the image to expose such film more quickly than if the image were another color. This feature also enables the use of lower beam current results in the beam having a smaller focal spot, improving resolution over previous cathode ray tubes. The cathode ray tube of this system has a beam focal spot diameter ranging from about 0.0017 to 0.0024 inches as beam current ranges between about 4 and 25 microamperes.

Preferably, the cathode ray tube is a Model 4869 cathode ray tube, manufactured by the Radio Corporation of America, Lancaster, Pa.

The film camera 24 is suitably positioned to view the monitor 20 for recording on the film the image produced by the monitor. The film camera 24 is suitably embodied by either a 105 millimeter still (single frame) camera, e.g., Model 6343, manufactured by Picker Corporation, Cleveland, Ohio, or by a moving picture, or "cine" camera, e.g., Model 3662, manufactured by Picker Corporation, Cleveland, Ohio.

The system described above has the capability of producing diagnostic quality television images of X-ray patterns from a patient. Tests have shown this system has a total modulation transfer function approximately described by a curve defined by the following points when the modified isocon television pickup tube is used:

| Line pairs/m.m. | % Contrast |
|---|---|
| 0.25 | 85 |
| 0.50 | 78 |
| 1.00 | 50 |
| 1.50 | 21 |
| 2.00 | 8 |

A system having a modulation transfer function as described above is capable of producing images which have superior anality relative to that of previously produced television images.

Evidence indicates that, when the image isocon pickup table is replaced with the above-described plumbicon pickup tube, the modulation transfer function of the system is even better than that described above.

The embodiment described in this detailed description is intended as illustrative rather than exhaustive, and it is to be recognized that persons of skill in the art may make modifications, changes or additions to the embodiment described herein without departing from the spirit and the scope of the invention as described herein and in the appended claims.

What is claimed is:

1. In a system for producing a visible light image corresponding to a pattern of penetrative radiation emergent from a subject, the system including a source for directing penetrative radiation through the subject, means for converting the emergent penetrative radiation pattern to a visible light image, electrical apparatus for converting the visible light image to electrical signals, and a display apparatus including a cathode ray tube having an electron gun for producing an electron beam, an output face and a phosphor layer on the inner surface of the output face, the phosphor layer being disposed for impingement by the electron beam and for emitting light for producing a second visible image representing the pattern of penetrative radiation when the electron beam strikes the phosphor, the improvement comprising:

a. the output face of the cathode ray tube having a substantially planar configuration; and
b. the focal spot of the electron beam having a diameter of no more than about 0.0017 inches at an electron beam current of about 4 microamperes.

2. In a system for producing a visible light image corresponding to a pattern of penetrative radiation emergent from a subject, the system including a source for directing penetrative radiation through the subject, means for converting the emergent penetrative radiation pattern to a visible light image, electrical apparatus for converting the visible light image to electrical signals, and a display apparatus including a cathode ray tube having an electron gun for producing an electron beam, an output face and a phosphor layer on the inner surface of the output face, the phosphor layer being disposed for impingement by the electron beam and for emitting light for producing a second visible image representing the pattern of penetrative radiation when the electron beam strikes the phosphor, the improvement comprising:
a. the output face of the cathode ray tube having a substantially planar configuration, and
b. the focal spot of the electron beam having a diameter of no more than 0.0024 inches at a beam current of approximately 25 microamperes.

* * * * *